(12) United States Patent
Sudo (10) Patent No.: US 7,760,286 B2
(45) Date of Patent: Jul. 20, 2010

(54) LIQUID CRYSTAL DISPLAY DEVICE

(75) Inventor: Tatsuji Sudo, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 226 days.

(21) Appl. No.: 12/027,308

(22) Filed: Feb. 7, 2008

(65) Prior Publication Data

US 2008/0192168 A1    Aug. 14, 2008

(30) Foreign Application Priority Data

Feb. 8, 2007    (JP)    ............... 2007-029504

(51) Int. Cl.
*G02F 1/1333*    (2006.01)
(52) U.S. Cl. ........................ 349/58; 362/165
(58) Field of Classification Search ............ 349/58, 349/65; 362/165
See application file for complete search history.

(56) References Cited

U.S. PATENT DOCUMENTS

2002/0113918 A1 *   8/2002   Hiratsuka et al.   ............. 349/65
2004/0223092 A1    11/2004   Wu et al.
2006/0023141 A1     2/2006   Oka
2006/0198131 A1     9/2006   Lai
2008/0106667 A1 *   5/2008   Fukuda   ........................ 349/58

FOREIGN PATENT DOCUMENTS

| JP | 11-133418 A | 5/1999 |
| JP | 2002-072914 A | 3/2002 |
| JP | 2003-050549 A | 2/2003 |
| JP | 2006-330271 A | 12/2006 |
| JP | 2007-086625 A | 4/2007 |

* cited by examiner

*Primary Examiner*—Akm E Ullah
(74) *Attorney, Agent, or Firm*—Global IP Counselors, LLP (57) ABSTRACT

A liquid crystal display device includes a rear frame, a liquid crystal panel and a bezel. The liquid crystal panel is disposed on a front side of the rear frame. The bezel has a rectangular frame shape and holds the liquid crystal panel from a front side of the liquid crystal panel to fix the liquid crystal panel with respect to the rear frame. The bezel includes a pair of first support frames forming middle portions of long sides of the bezel and a pair of second support frames forming short sides of the bezel and end portions of the long sides of the bezel. The first and second support frames are fastened to the rear frame.

8 Claims, 6 Drawing Sheets

LIQUID CRYSTAL DISPLAY DEVICE

CROSS-REFERENCE TO RELATED APPLICATIONS

This application claims priority to Japanese Patent Application No. 2007-029504 filed on Feb. 8, 2007. The entire disclosure of Japanese Patent Application No. 2007-029504 is hereby incorporated herein by reference.

BACKGROUND OF THE INVENTION

1. Field of the Invention

The present invention generally relates to a liquid crystal display device. More specifically, the present invention relates to a liquid crystal display device having a bezel.

2. Background Information

Liquid crystal display devices have been widely used in notebook PCs, PC monitors, home television sets and so forth since the liquid crystal display devices are thin and lightweight and have low power consumption. A liquid crystal display device includes a liquid crystal panel, a backlight and a bezel. The liquid crystal panel displays images. The backlight emits light from a back of the liquid crystal display panel. An image is formed on a front of the liquid crystal panel when the light emitted from the backlight is either transmitted or blocked by the liquid crystal panel.

The bezel is a frame-like member and is used for securely supporting and fixing the backlight and the liquid crystal panel close together so as to obtain an image of high brightness and little inconsistency in brightness with the liquid crystal display device.

A conventional bezel for a liquid crystal display device includes a plurality of support frames (see Japanese Laid-Open Patent Application No. H11-133418, for example). Another conventional bezel for a liquid crystal display device includes a plurality of support frames and L-shaped linking members (see Japanese Laid-Open Patent Application No. 2003-50549). The linking members are disposed at corner portions where the plurality of support frames are abutted together so that the support frames are linked together to form the conventional bezel.

Also, another conventional bezel includes a plastic frame and a bezel (see Japanese Laid-Open Patent Application No. 2002-72914, for example). The frame includes threaded portions protruding from side faces of the frame. The bezel includes extension portions. The threaded portions of the frame and the extension portions of the bezel are lined up to fasten the bezel to the frame with bolts.

There has been a tendency for liquid crystal display devices having liquid crystal panels to be larger in recent years. As a result, there has been a tendency for bezels used to fix the liquid crystal panels to be larger. If the support frames are too long when the bezel is divided into the support frames, then the support frames are prone to sagging or twisting. As a result, the strength of the bezel decreases. Furthermore, if the bezel sags or twists, then the liquid crystal display device can be damaged or deformed, which lowers the quality of the image displayed by the liquid crystal display device.

Also, if the linking members are used at the corner portions when the divided support frames are assembled into a rectangle, the number of parts required is increased, and also more assembly work and time are required. Also, since the linking members are attached, the liquid crystal display device ends up being thicker.

Furthermore, if the threaded components and the extension portions are necessary, the shapes of the frame and the bezel become more complicated. As a result, manufacturing and assembly take more time and work.

In view of the above, it will be apparent to those skilled in the art from the disclosures that there exists a need for an improved liquid crystal module. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a liquid crystal display device having a rigid structure.

In accordance with one aspect of the present invention, a liquid crystal display device includes a rear frame, a liquid crystal panel and a bezel. The liquid crystal panel is disposed on a front side of the rear frame. The bezel has a rectangular frame shape and holds the liquid crystal panel from a front side of the liquid crystal panel to fix the liquid crystal panel with respect to the rear frame. The bezel includes a pair of first support frames forming middle portions of long sides of the bezel and a pair of second support frames forming short sides of the bezel and end portions of the long sides of the bezel. The first and second support frames are fastened to the rear frame.

With the liquid crystal display device of the present invention, it is possible to provide a liquid crystal display device having a rigid structure.

These and other objects, features, aspects and advantages of the present invention will become apparent to those skilled in the art from the following detailed description, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from the disclosures that the following descriptions of the embodiments of the present invention are provided for illustration only and not for the purpose of limiting the invention as defined by the appended claims and their equivalents.

Figure 1:
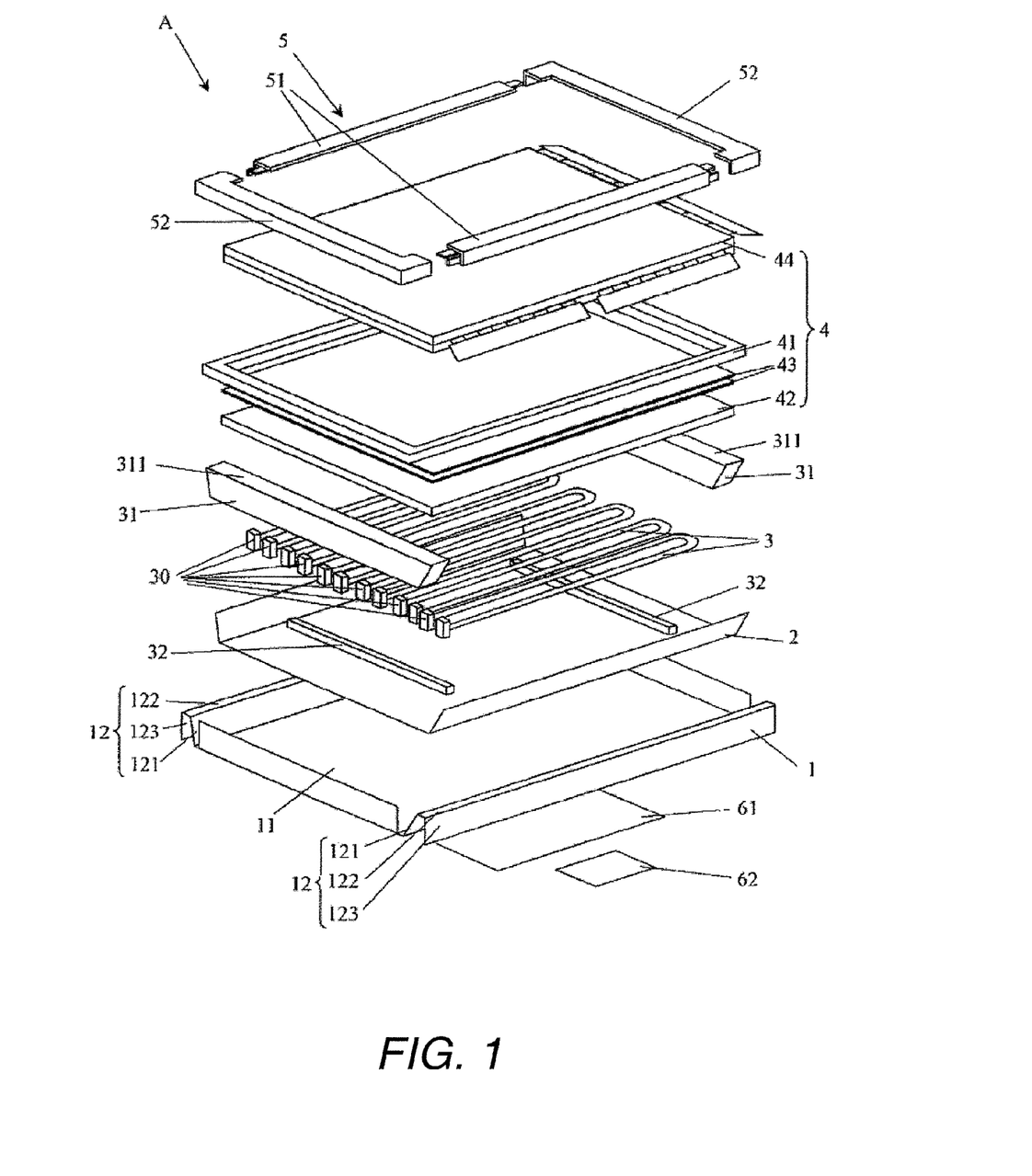
FIG. 1 is an exploded perspective view of a liquid crystal display device in accordance with a first embodiment of the present invention.

FIG. 1 is an exploded perspective view of a liquid crystal display device A. The liquid crystal display device A includes a rear frame (e.g., rear side supporting means) 1, a reflector sheet 2, a backlight 3, a pair of light frames 31, a liquid crystal panel (e.g., electric component means) 4, a bezel (e.g., front side supporting means) 5, a main board 61 and a timing controller board 62. It is noted that a side of the rear frame 1 with respect to the bezel 5 (e.g., a lower side of FIG. 1) is referred to as a "rear" side, and an opposite side of the rear side (e.g., an upper side of FIG. 1) is referred to as a "front" side. Furthermore, a side of an opening framed by the bezel 5 with respect to the bezel 5 (e.g., a side of a center of the opening with respect to the bezel 5) is referred to as an "inner" side, and an opposite side of the inner side (e.g., a side of the bezel 5 with respect to the center of the opening) is referred to as an "outer" side.

Figure 5:
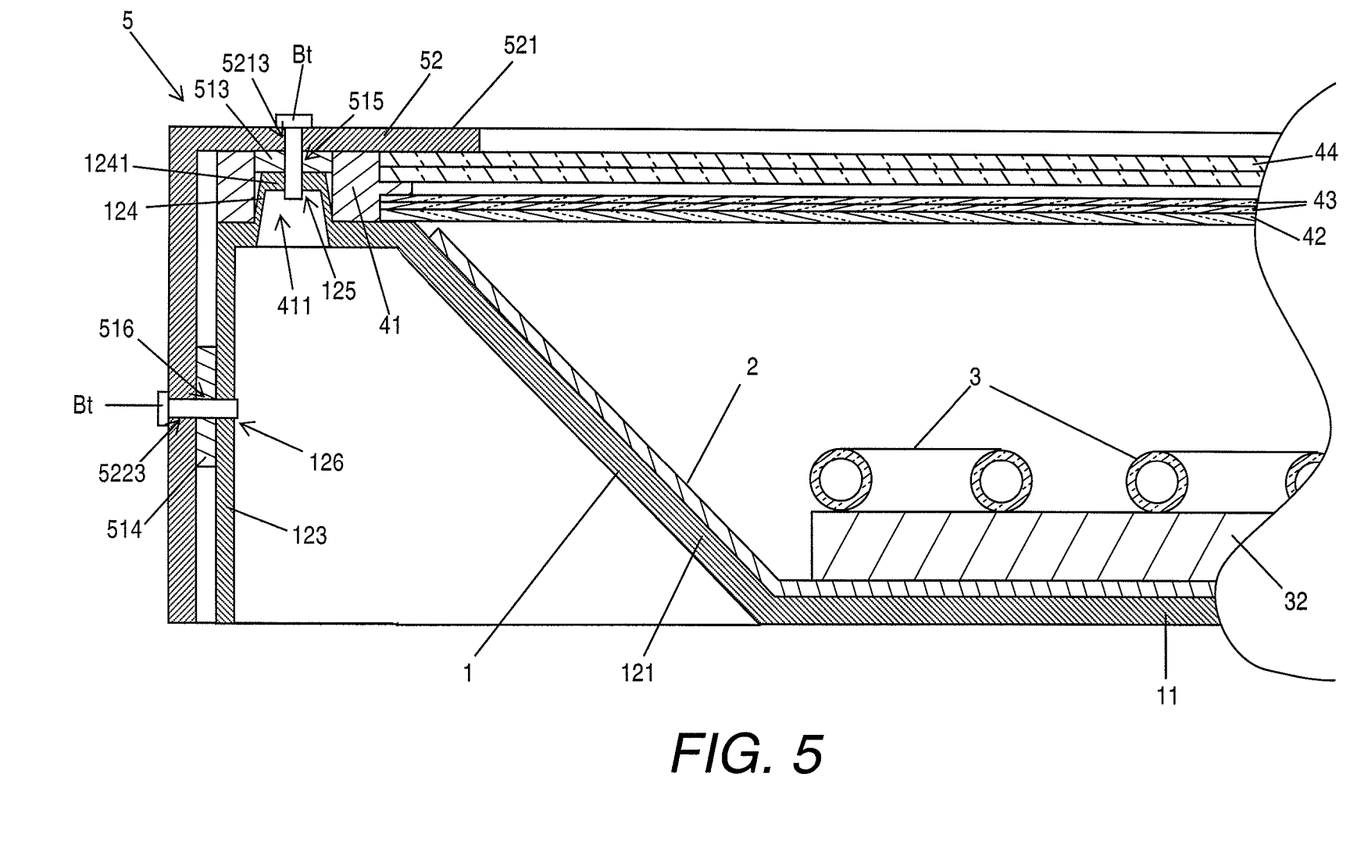
FIG. 5 is a partial cross sectional view of the bezel illustrated in FIG. 3A.

The rear frame 1 is formed by bending sheet metal. The rear frame 1 has a rectangular back face component 11 and a pair of raised components 12. The raised components 12 are erected on two long sides of the back face component 11. Each of the raised components 12 has a connecting component 121, a support component 122 and a side wall component 123, respectively. The connecting component 121 rises up at an angle from the back face component 11. Specifically, the connecting component 121 extends outward and frontward from each of the long sides of the back face component 11. The support component 122 is formed by bending to extend outwardly from a front end of the connecting component 121 and supports a long side of the liquid crystal panel 4. The support component 122 includes attachment components 124, as shown in FIG. 5. The attachment components 124 are extruded in trapezoidal form in vicinity of both ends of the support component 122 of the rear frame 1. The side wall component 123 is formed by bending to extend rearward from an outer end of the support component 122 toward the rear side of the rear frame 1. The side wall component 123 is across from the connecting component 121. The support components 122 are substantially parallel to the back face component 11. The side wall components 123 are substantially perpendicular to the back face component 11.

The reflector sheet 2 is disposed on a front face (or an upper face in FIG. 1) of the back face component 11 of the rear frame 1. The reflector sheet 2 is attached in close contact with the connecting components 121 and the back face component 11 of the rear frame 1. After the reflector sheet 2 has been disposed on the front face of the rear frame 1, the backlight 3 is mounted. The backlight 3 includes a plurality of lamp holders 30 with a plurality of cathode tubes formed in a U-shape. The lamp holders 30 are attached at both ends of the cathode tubes. A power line (not shown) is connected to the lamp holders 30, and electrical power for driving the backlight 3 is supplied by the power line. Also, the rear frame 1 has a pair of light support member 32. The light support members 32 are fixedly provided to the rear frame 1 to support the backlight 3. Specifically, the light support members 32 pass through the reflector sheet 2 and are fixed to the rear frame 1.

The light frames 31 are attached to short sides of the rear frame 1 from the front side of the rear frame 1. The light frames 31 support the lamp holders 30 and bent-back portions of the backlight 3. The light frames 31 are trapezoidal in shape, and are disposed so as to be in contact with the connecting components 121 and the back face component 11 of the rear frame 1. Also, each of the light frames 31 includes a support component 311. The support components 311 form the same plane as the support components 122 of the rear frame 1 when the light frames 31 are disposed on the short sides of the rear frame 1.

The liquid crystal panel 4 has a cell guide 41, a diffusion plate 42, two diffusion sheets 43 and a liquid crystal cell 44. The diffusion plate 42 and the diffusion sheets 43 diffuse the light emitted from the backlight 3 and the light reflected by the reflector sheet 2. The liquid crystal cell 44 has a pair of glass substrates facing each other and liquid crystal filled in a gap formed between the glass substrates. Outer peripheral portions of the diffusion plate 42 are supported on the support components 311 of the light frames 31 and on the support components 122 of the rear frame 1. The two diffusion sheets 43 are disposed on a front face of the diffusion plate 42.

The cell guide 41 is a rectangular frame. The cell guide 41 presses four sides of the diffusion plate 42 and the diffusion sheets 43 from the front side of the cell guide 41 toward the support components 311 of the light frames 31 and the support components 122 of the rear frame 1. The liquid crystal cell 44 is mounted on a front face of the cell guide 41, and is supported on all four sides by the cell guide 41. On the glass substrates of the liquid crystal cell 44, transparent electrodes are formed for each of pixels so as to be across from each other. When a specific voltage is applied between the opposing transparent electrodes, the light from the diffusion sheets 43 is either transmitted or blocked. Then, an image is formed on the liquid crystal panel 4.

The bezel 5 is a support frame attached to the periphery of the liquid crystal panel 4 to fix the liquid crystal panel 4 with respect to the rear frame 1 in the liquid crystal display device A. The bezel 5 is a rectangular metal frame capable of covering the rear frame 1 and the light frames 31. The bezel 5 includes four members: a pair of first support frames 51 and a pair of second support frames 52. The first support frames 51 form middle portions of long sides of the rectangular bezel 5. The second support frames 52 form short sides and end portions of the long sides of the rectangular bezel 5. The bezel 5 presses the liquid crystal cell 44 and the cell guide 41 of the liquid crystal panel 4 from the front side of the liquid crystal panel 4 toward the rear frame 1. The bezel 5 has an opening that allows an image displayed on the liquid crystal panel 4 to be viewed from the front side of the liquid crystal display device A. The bezel 5 is bolted to the rear frame 1 and the light frames 31. Bolts fastening the bezel 5 pass through the cell guide 41. When the bezel 5 is securely fixed to the light frames 31 and the rear frame 1, the liquid crystal panel 4 is fixed in a stable state by being sandwiched between the bezel 5 and the light frames 31 and the rear frame 1.

The main board 61 is a printed wiring board having a plurality of electronic parts mounted thereon. The main board 61 is preferably formed in a rectangular shape. The main board 61 supplies drive power to the various components of the liquid crystal display device A, adjusts input/output signals, and so forth. The timing controller board 62 is a printed wiring board on which a timing controller (not shown) that sends out timing pulses is mounted. The timing controller board 62 is preferably formed in a rectangular shape. A plurality of other electronic parts can be also mounted besides the timing controller.

Figure 2A:
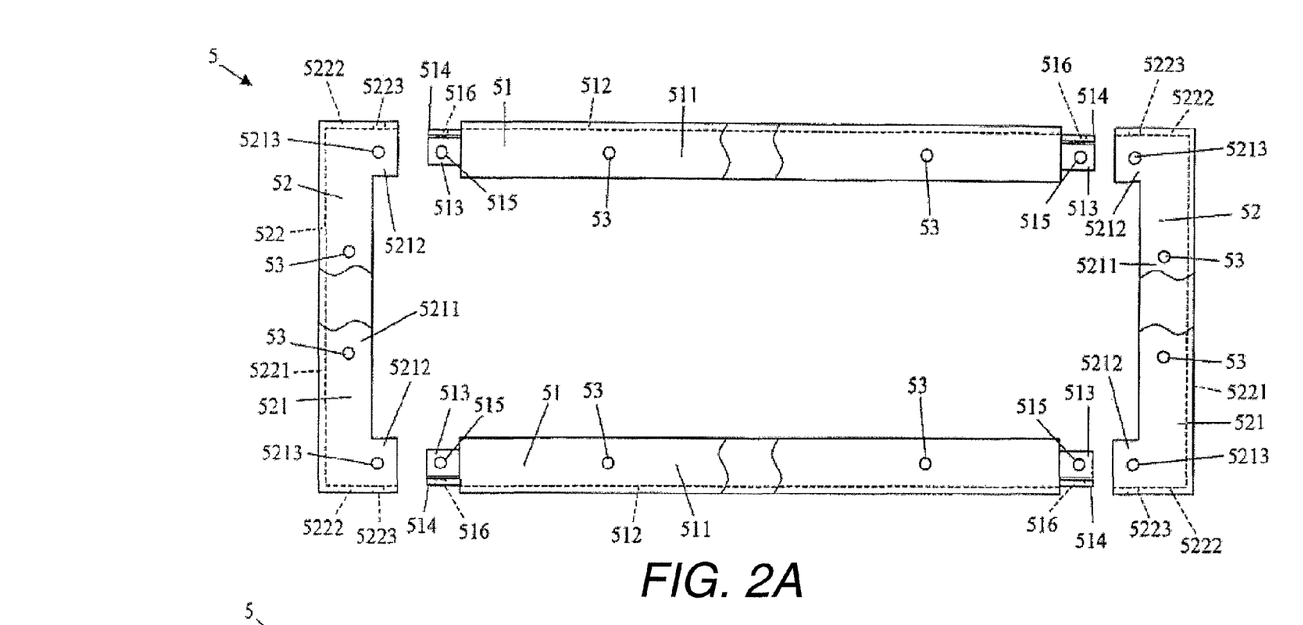
FIG. 2A is an exploded front elevational view of a bezel of the liquid crystal display device illustrated in FIG. 1.
Figure 2B:
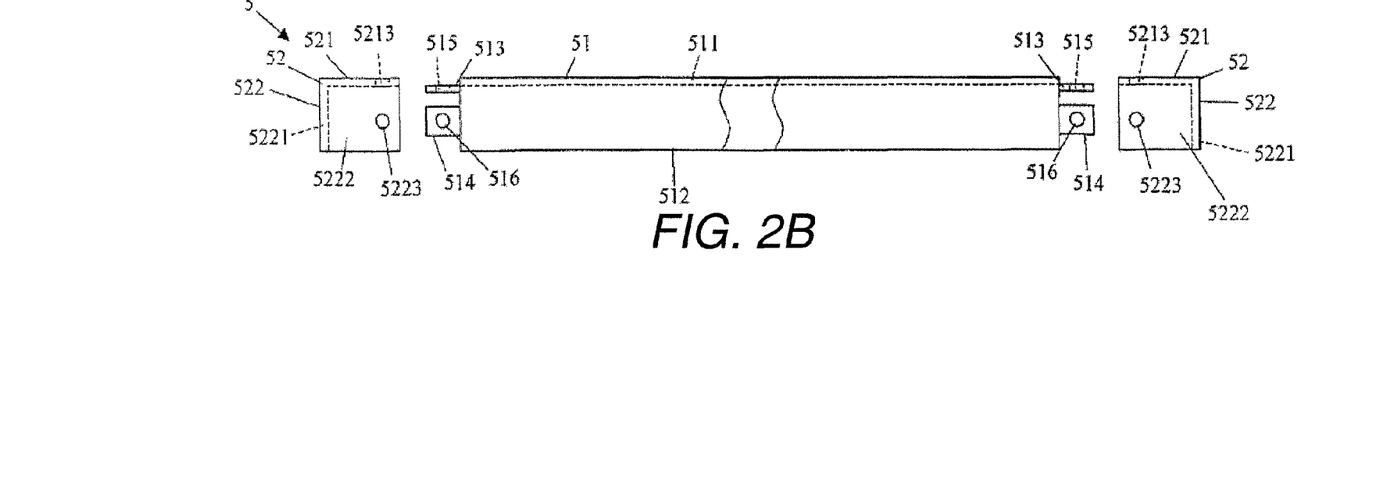
FIG. 2B is a bottom plan view of the bezel illustrated in FIG. 2A.
Figure 3A:
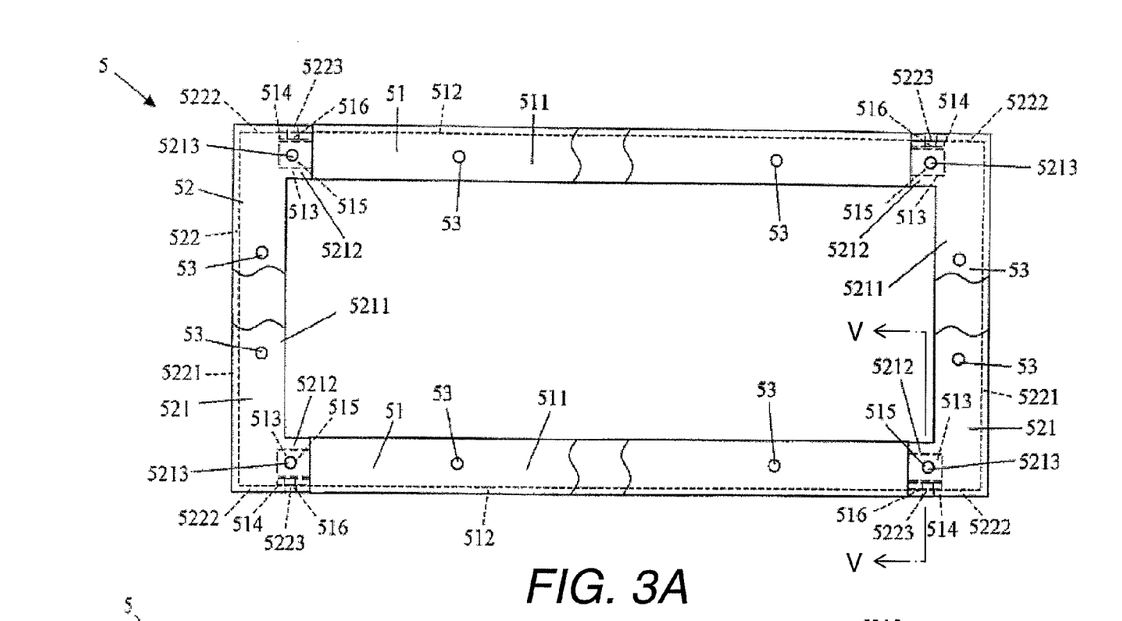
FIG. 3A is a front elevational view of the bezel of the liquid crystal display device illustrated in FIG. 1.
Figure 3B:
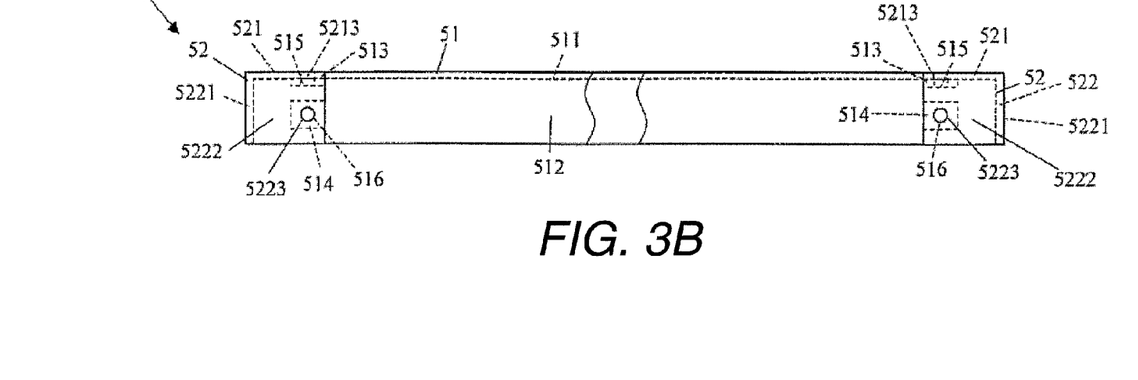
FIG. 3B is a bottom plan view of the bezel illustrated in FIG. 3A.
Figure 4:
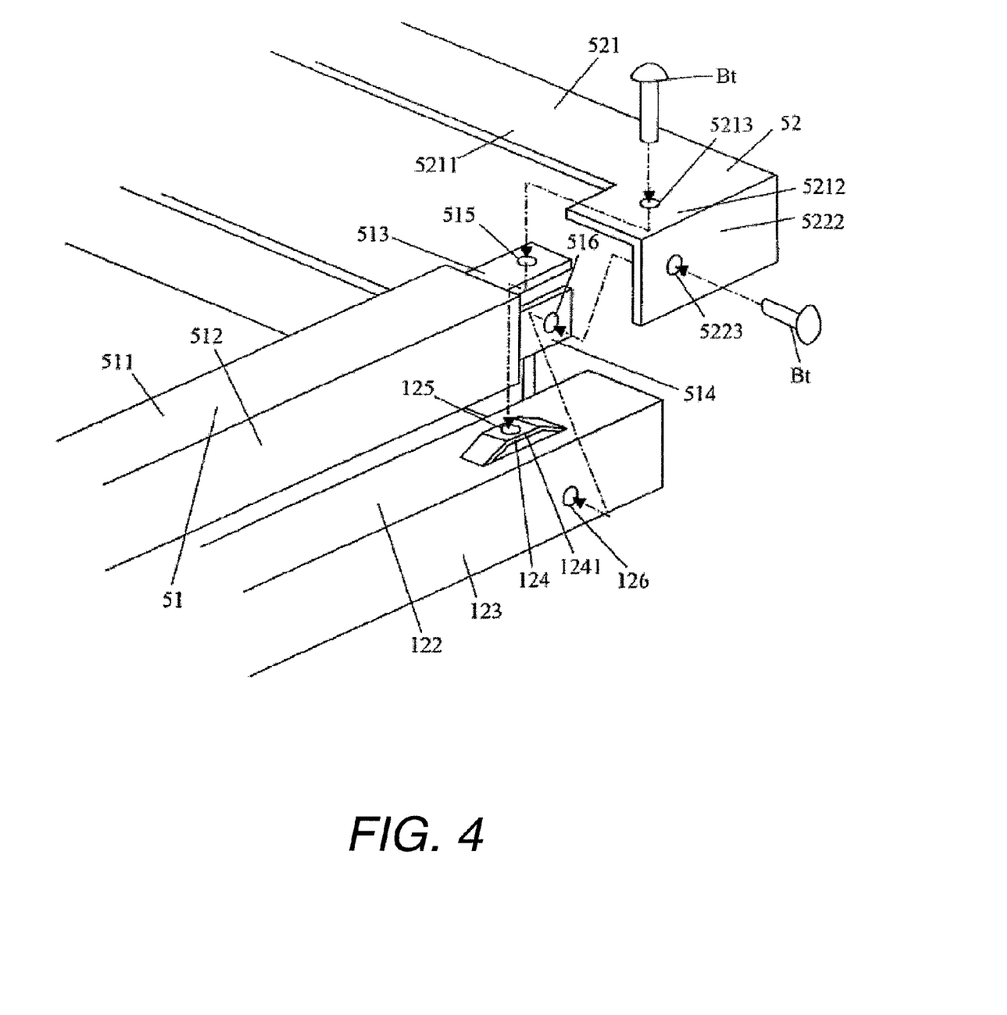
FIG. 4 is an exploded perspective view illustrating in detail a portion of the liquid crystal display device illustrated in FIG. 1.

FIG. 2A is an exploded front elevational view of the bezel 5 of the liquid crystal display device A. FIG. 2B is a bottom plan view of the bezel 5 shown in FIG. 2A. FIG. 3A is a front elevational view of an assembled state of the bezel 5 of the liquid crystal display device A. FIG. 3B is a bottom plan view of the bezel 5 shown in FIG. 3A. FIG. 4 is an exploded perspective view illustrating in detail the liquid crystal display device A. FIG. 5 is a cross sectional view of the bezel 5 shown in FIG. 3A. In FIG. 4, components other than the rear frame 1 and the bezel 5 are omitted for the sake of simplicity.

As shown in FIGS. 2A and 2B, the bezel 5 includes the first support frames 51 and the second support frames 52. The first support frames 51 are slender members with an L-shaped cross section. Each of the first support frames 51 has a front face component 511, a lateral face component 512, a first linking tab 513 at each end and a second linking tab 514 at each end. The front face components 511 are located across from the support components 122 of the rear frame 1. The lateral face components 512 are integrally formed with the front face components 511. Specifically, the lateral face components 512 extend rearward from outer ends of the front face components 511 and contact with the side wall components 123 of the rear frame 1. The first linking tabs 513 extend from both lateral ends of each of the front face components 511. The second linking tabs 514 extend from both lateral ends of each of the lateral face components 512. The first linking tabs 513 and the second linking tabs 514 are formed for linking the first support frames 51 to the second support frames 52.

Each of the second support frames 52 has a front face component 521 and a lateral face component 522. The front face components 521 have a U shape in front elevation view. The lateral face components 522 are integrally formed with the front face components 521. Specifically, the lateral face components 522 extend rearward from outer peripheral edges of the front face components 521. Each of the front face components 521 includes a short side component 5211 and a long side component 5212. The short side components 5211 form the short sides of the bezel 5. The long side components 5212 form the end portions of the long sides. Similarly, each of the lateral face components 522 includes a short side lateral component 5221 and a long side lateral component 5222. The short side lateral components 5221 extends rearward from outer ends of the short side components 5211 of the front face components 521. The long side lateral components 5222 extend rearward from outside ends of the long side components 5212. The short side lateral components 5221 and the long side lateral components 5222 of the lateral face components 522 are formed so as to form a right angle in the front elevation view.

First through-holes 515 are formed in the first linking tabs 513 of the first support frames 51. Second through-holes 516 are formed in the second linking tabs 514. Third through-holes 5213 are formed in the long side components 5212 of the front face components 521. Fourth through-holes 5223 are formed in the long side lateral components 5222 of the lateral face components 522. As shown in FIGS. 3A and 3B, the first linking tabs 513 of the first support frames 51 are disposed on rear faces of the front face components 521 so that the first through-holes 515 and the third through-holes 5213 overlap. Furthermore, the second linking tabs 514 of the first support frames 51 are disposed on inner faces of the lateral face components 522 so that the second through-holes 516 and the fourth through-holes 5223 overlap.

As shown in FIG. 4, the attachment components 124 are formed in the vicinity of both lateral ends of the support components 122 of the rear frame 1. The attachment components 124 include seat components 1241. The seat components 1241 are formed in the middle of the attachment components 124 in parallel with the support components 122. First female threaded holes 125 are formed in the seat components 1241. Also, second female threaded holes 126 are formed in the vicinity of both lateral ends of the side wall components 123. As shown in FIG. 4, the bezel 5 is assembled by attaching the first support frames 51 to the second support frames 52 so that the first through-holes 515 overlap the third through-holes 5213 of the second support frames 52, and the second through-holes 516 overlap the fourth through-holes 5223.

Also, as shown in FIGS. 3A and 3B, through-holes 53 are formed in the front face components 521 of the second support frames 52 and in the front face components 511 of the first support frames 51. Furthermore, through-holes (not shown) are also provided to the cell guide 41 of the liquid crystal panel 4. The thorough-holes line up with the through-holes 53 when the bezel 5 is assembled to the liquid crystal panel 4. Furthermore, female threaded holes are formed on the support components 122 at positions where the female threaded holes line up with the through-holes 53 when the bezel 5 is placed over the support components 122 of the rear frame 1. Also, as shown in FIG. 5, positioning holes 411 are formed in the cell guide 41. The attachment components 124 pass through the positioning holes 411 when the cell guide 41 is disposed on the front side of the support components 122 of the rear frame 1.

When assembling the liquid crystal display device A, the reflector sheet 2 is disposed on the rear frame 1 so as to cover the front side of the connecting components 121 and the back face component 11 of the rear frame 1. Then, the backlight 3 is disposed on the back face component 11 of the rear frame 1 via the light support members 32 disposed on the front face of the reflector sheet 2. The light frames 31 are attached from the front side of the rear frame 1 to fix the backlight 3 from the front side and restrict movement of the backlight 3.

When the light frames 31 are attached to the rear frame 1, the support components 122 of the rear frame 1 and the support components 311 of the light frames 31 are disposed in the same plane. The diffusion plate 42 is disposed so that the four sides of the diffusion plate 42 are supported by the support components 122 and the support components 311. Then, the diffusion sheets 43 are disposed on the front face of the diffusion plate 42 with overlapping the diffusion plate 42. The cell guide 41 is disposed on the diffusion sheets 43 from the front side of the diffusion sheets 43 to prevent the diffusion plate 42 and the diffusion sheets 43 from lifting up or becoming misaligned. The cell guide 41 is disposed so that the attachment components 124 of the support components 122 pass through the positioning holes 411. As a result, the cell guide 41 can be disposed at a proper position with respect to the rear frame 1, as shown in FIG. 5.

The liquid crystal cell 44 is mounted to the cell guide 41 from the front side of the cell guide 41. The cell guide 41 is mounted on the front face of the support components 311 of the light frames 31 and the support components 122 of the rear frame 1. The first support frames 51 and the second support frames 52 are assembled into a rectangle frame in advance to form the bezel 5. The bezel 5 is mounted to the liquid crystal panel 4 from the front side of the cell guide 41 in which the liquid crystal cell 44 is mounted. The bezel 5 is assembled such that the second linking tabs 514 are attached to the inner face of the long side lateral components 5222 and the first linking tabs 513 are attached to the rear face of the long side components 5212 of the second support frames 52.

The assembled bezel 5 is attached from the front side of the rear frame 1. The first through-holes 515 and the third through-holes 5213 of the bezel 5 are disposed so as to line up with the first female threaded holes 125 formed in the attachment components 124. The second through-holes 516 and the fourth through-holes 5223 are disposed so as to line up with the second female threaded holes 126 in the rear frame 1. Bolts Bt are then passed through the first through-holes 515 and the third through-holes 5213 and threaded into the first female threaded holes 125. Also, the bolts Bt are passed through the second through-holes 516 and the fourth through-holes 5223 and threaded into the second female threaded holes 126. As a result, the first support frames 51 and the second support frames 52 of the bezel 5 are both fastened and fixed to the rear frame 1.

The through-holes 53 are disposed so as to line up with the female threaded holes (not shown) formed in the rear frame 1 and the through-holes (not shown) formed in the cell guide 41. The bolts Bt are inserted from above the bezel 5 into the through-holes (not shown) formed in the cell guide 41 and the through-holes 53 formed in the bezel 5. Then, the bolts Bt are threaded into the female threaded holes (not shown) formed in the support components 122 of the rear frame 1. As a result, the rear frame 1, the liquid crystal panel 4 and the bezel 5 are fastened together.

With the liquid crystal display device A, the first support frames 51 and the second support frames 52 are both abutted together and fastened to the rear frame 1 in the vicinity of both end portions of the long sides of the bezel 5, rather than at the corners of the bezel 5. Thus, the bending and twisting strength of the bezel 5 can be increased. In other words, the bending and twisting deformation of the bezel 5 can be suppressed. Moreover, since the second support frames 52 are formed in U shape, shock resistance at corners of the bezel 5 can be increased. Furthermore, there is a corresponding reduction in bending, twisting and so forth of the liquid crystal panel 4 that is held in place by the bezel 5 and fixed to the rear frame 1. As a result, a corresponding reduction in image disruption in the liquid crystal panel 4 can be achieved with a simple structure.

Second Embodiment

Figure 6:
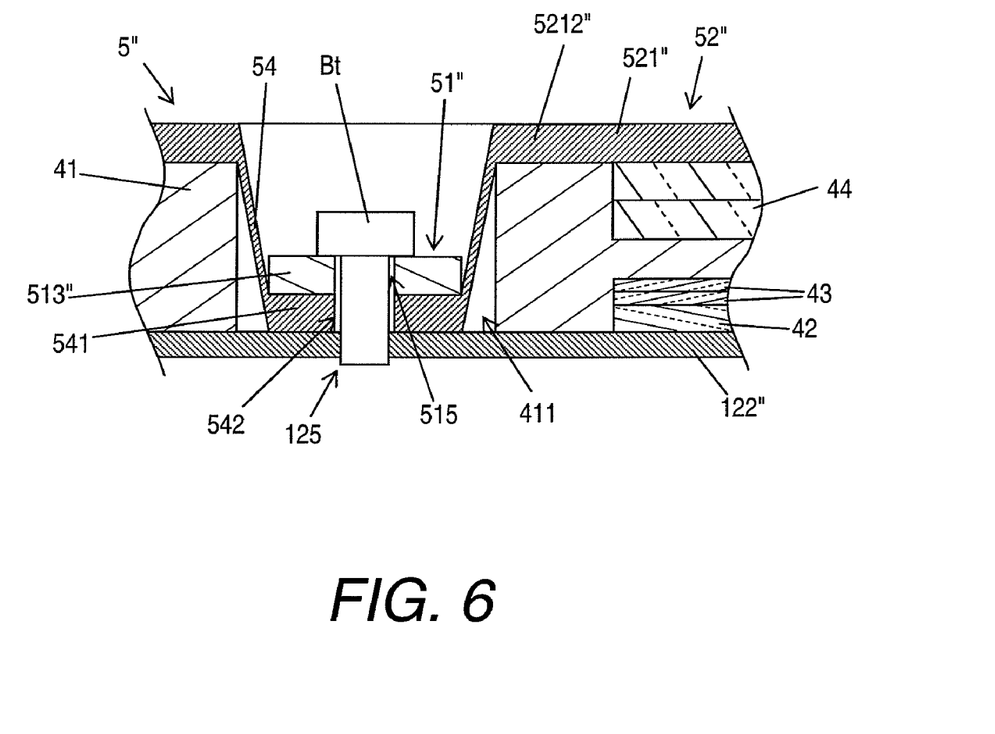
FIG. 6 is a partial cross sectional view of a liquid crystal display device in accordance with a second embodiment of the present invention.

Referring now to FIG. 6, a bezel 5" in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a double prime (").

As shown in FIG. 6, the long side components 5212" of the second support frames 52" can be intruded rearward in a convex shape to form intruding portions 54. The intruding portions 54 include bottom face components 541 and through-holes 542. The bottom face components 541 are parallel to the front face components 521". The through-holes 542 are formed in the bottom face components 541. When the bezel 5" is assembled, the first linking tabs 513" of the first support frames 51" are located between the bottom face components 541 and the front face components 521".

The first female threaded holes 125 are formed in the support components 122". The attachment components 124 are not formed in the support components 122". The intruding portions 54 pass through the positioning holes 411 of the cell guide 41. Bolts Bt are passed through the first linking tabs 513" and the through-holes 542 and are threaded into the first female threaded holes 125 to fix the bezel 5" to the rear frame 1.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from the disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A liquid crystal display device comprising:
    a rear frame formed by bending sheet metal, the rear frame including a rectangular back face component, a plurality of connecting components extending outward and frontward from long sides of the back face component, a plurality of support components extending outward from the connecting components in parallel to the back face component and a plurality of side wall components extending rearward from the connecting components so as to be perpendicular to the back face component;
    a liquid crystal panel disposed on a front side of the rear frame; and
    a bezel having a rectangular frame shape and holding the liquid crystal panel from a front side of the liquid crystal panel to fix the liquid crystal panel with respect to the rear frame, the bezel including a pair of first support frames forming middle portions of long sides of the bezel and a pair of second support frames forming short sides of the bezel and end portions of the long sides of the bezel, the first and second support frames being fastened to the rear frame,
    the second support frames being formed in a U shape in a front elevational view,
    the first and second support frames being assembled so as to partly overlap and fastened to the rear frame with bolts at locations where the first and second support frames overlap, and
    the first and second support frames being fastened to the support components and the side wall components with the bolts.

2. The liquid crystal display device according to claim 1, wherein
    the liquid crystal panel includes a diffusion plate, a diffusion sheet, a liquid crystal cell and a cell guide pressing the diffusion plate and the diffusion sheet against the rear frame from the front side of the liquid crystal display device and supporting the liquid crystal cell, and the bezel presses the liquid crystal cell and the cell guide against the rear frame from the front side of the liquid crystal display device when the bezel is fastened to the rear frame.

3. The liquid crystal display device according to claim 2, wherein each of the support components of the rear frame includes a trapezoidal attachment component with a female threaded hole, the attachment components protruding from the support components and passing through positioning holes formed in the cell guide, and the first and second support frames are fastened to the support components by screwing the bolts to the female threaded holes of the attachment components.

4. A liquid crystal display device comprising:

a rear frame formed by bending sheet metal, the rear frame including a rectangular back face component, a plurality of connecting components extending outward and frontward from long sides of the back face component, a plurality of support components extending outward from the connecting components in parallel to the back face component and a plurality of side wall components extending rearward from the connecting components so as to be perpendicular to the back face component, with each of the support components including a female threaded hole;

a liquid crystal panel disposed on a front side of the rear frame, the liquid crystal panel including a diffusion plate, a diffusion sheet, a liquid crystal cell and a cell guide pressing the diffusion plate and the diffusion sheet against the rear frame from the front side of the liquid crystal display device and supporting the liquid crystal cell; and a bezel having a rectangular frame shape and holding the liquid crystal panel from a front side of the liquid crystal panel to fix the liquid crystal panel with respect to the rear frame, the bezel including a pair of first support frames forming middle portions of long sides of the bezel and a pair of second support frames forming short sides of the bezel and end portions of the long sides of the bezel, the first and second support frames being fastened to the rear frame, the second support frames being formed in a U shape in a front elevational view, the first and second support frames being assembled so as to partly overlap and fastened to the rear frame with bolts at locations where the first and second support frames overlap, the first and second support frames being fastened to the support components and the side wall components with the bolts, the bezel pressing the liquid crystal cell and the cell guide against the rear frame from the front side of the liquid crystal display device when the bezel is fastened to the rear frame, each of the second support frames including an intruding portion with a through hole formed in a bottom portion of the intruding portion at locations where the second support frames form the end portions of the long sides of the bezel, the intruding portions intruding rearward from front faces of the second support frames and passing through positioning holes formed in the cell guide, each of the first support frames including a linking tab with a through hole, the linking tabs being disposed on the bottom portions of the intruding portions at a rear side of the front faces of the second support frames, and the first and second support frames being fastened to the support components by screwing the bolts to the female threaded holes of the support components, with the bolts being inserted through both the through holes of the intruding portions and the through holes of the linking tabs.

5. A liquid crystal display device comprising:

a rear frame formed by bending sheet metal, the rear frame including a rectangular back face component, a plurality of connecting components extending outward and frontward from long sides of the back face component, a plurality of support components extending outward from the connecting components in parallel to the back face component and a plurality of side wall components extending rearward from the connecting components so as to be perpendicular to the back face component;

a liquid crystal panel disposed on a front side of the rear frame, the liquid crystal panel including a diffusion plate, a diffusion sheet, a liquid crystal cell and a cell guide pressing the diffusion plate and the diffusion sheet against the rear frame from the front side of the liquid crystal display device and supporting the liquid crystal cell;

a bezel having a rectangular frame shape and holding the liquid crystal panel from a front side of the liquid crystal panel to fix the liquid crystal panel with respect to the rear frame, the bezel including a pair of first support frames forming middle portions of long sides of the bezel and a pair of second support frames forming short sides of the bezel and end portions of the long sides of the bezel, the first and second support frames being fastened to the rear frame;

a reflector sheet disposed on the front side of the rear frame in contact with the connecting components and the back face component of the rear frame;

a backlight having a plurality of U-shaped cathode tubes disposed on the front side of a part of the reflector sheet facing the back face component of the rear frame; and a light frame disposed on the front side of the backlight and supporting the backlight, the second support frames being formed in a U shape in a front elevational view, the first and second support frames being assembled so as to partly overlap and fastened to the rear frame with bolts at locations where the first and second support frames overlap, the first and second support frames being fastened to the support components and the side wall components with the bolts, and the bezel pressing the liquid crystal cell and the cell guide against the rear frame from the front side of the liquid crystal display device when the bezel is fastened to the rear frame.

6. The liquid crystal display device according to claim 5, wherein the diffusion plate has a rectangular shape and is disposed on the light frame and the support components of the rear frame, the diffusion sheet is disposed on the front side of the diffusion plate and includes two rectangular diffusion sheets, the cell guide has a frame shape and presses outer peripheral portions of the diffusion plate and the diffusion sheets from the front side of the diffusion sheet, and the liquid crystal cell is disposed on the front side of cell guide and includes a pair of glass substrates facing each other and liquid crystal sealed in between the glass substrates.

7. The liquid crystal display device according to claim 6, wherein each of the support components of the rear frame includes a trapezoidal attachment component with a first female threaded hole at both lateral ends of each of the support components, the attachment components protruding from front faces of the support components and passing through positioning holes formed in the cell guide, each of the side wall components of the rear frame includes a second female threaded hole at both lateral ends of each of the side wall components, the first and second support frames are fastened to the support components and the side wall components by screwing the bolts to the first female threaded holes of the support components and screwing the bolts to the second female threaded holes of the side wall components.

8. The liquid crystal display device according to claim 7, wherein each of the first support frames includes a front face component facing the support components of the rear frame, a lateral face component extending rearward from a respective one of the front face components and facing the side wall components of the rear frame, a first linking tab extending from both lateral ends of each of the front face components with a first through hole in each of the first linking tabs and a second linking tab extending from both lateral ends of each of the lateral face components with a second through hole in each of the second linking tabs, each of the second support frames includes a front face component formed in the U shape in the front elevational view with a third through hole in each of the front face components and a lateral face component extending rearward from respective outer peripheral portions of the front face components with a fourth through hole in each of the lateral face components, the third and fourth through holes being formed at locations where the second support frames form the end portions of the long sides of the bezel, the first and second support frames are assembled to form the bezel such that the first linking tabs of the first support frames contact with rear faces of the font face components of the second support frames and the second linking tabs contact with inner faces of the lateral face components of the second support frames, and the first and second support frames are fastened to the rear frame by screwing the bolts to the first female threaded holes of the support components, with the bolts being inserted through both the first and third through holes, and by screwing the bolts to the second female threaded holes of the side wall components, with the bolts being inserted through both the second and fourth through holes.

\* \* \* \* \*